(12) United States Patent
de Koning et al.

(10) Patent No.: US 6,266,512 B1
(45) Date of Patent: Jul. 24, 2001

(54) METHOD OF USING INPUT SIZE DETERMINATION FOR IMPROVEMENTS IN PRODUCTIVITY AND IMAGING

(75) Inventors: Petrus T. de Koning, Toronto; Scott A. Sinclair, Burlington; Ned Nenad Ivanovich, Brampton; Gary A. Faguy, Hamilton, all of (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/471,568

(22) Filed: Dec. 23, 1999

(51) Int. Cl.$^7$ .............................. G03G 15/00; B65H 3/44
(52) U.S. Cl. .................. 399/370; 271/9.01; 271/9.06; 399/376
(58) Field of Search .................. 399/363, 367, 399/370, 376; 271/9.01, 9.05, 9.06

(56) References Cited

U.S. PATENT DOCUMENTS

| | | | |
|---|---|---|---|
| 4,585,332 | 4/1986 | Shenoy | 355/14 R |
| 4,669,863 | 6/1987 | Yoshiura et al. | 355/14 SH |
| 4,908,672 | 3/1990 | Ito | 355/311 |
| 4,920,384 | * 4/1990 | Okamoto | 399/370 X |
| 4,947,206 | * 8/1990 | Ito | 399/370 X |
| 5,031,116 | * 7/1991 | Shukunami et al. | 399/370 X |
| 5,150,224 | 9/1992 | Mizude et al. | 358/449 |
| 5,291,225 | 3/1994 | Saito | 346/134 |
| 5,328,166 | 7/1994 | Hokamura | 271/171 |
| 5,360,207 | 11/1994 | Rauen et al. | 271/265 |

* cited by examiner

Primary Examiner—Fred L. Braun

(57) ABSTRACT

A method in an imaging system for automatically selecting a copy substrate from multiple substrate trays and for improving the productivity and imaging of the copy substrates. The method includes comparison of the dimensions of the copy substrate to the dimensions of the input document in order to automatically select a copy substrate, automatically rotate digital information in order to align the orientation of input and copy documents, center imaging information onto the copy substrate, and to perform various AutoFit functions.

21 Claims, 9 Drawing Sheets

FIG. 2
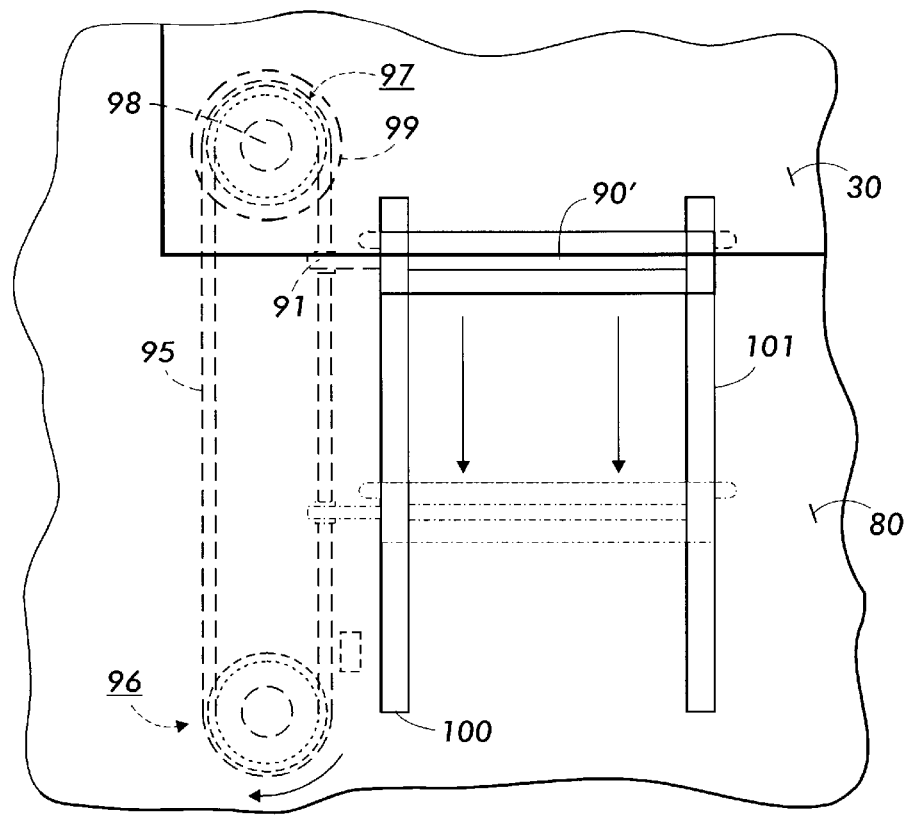
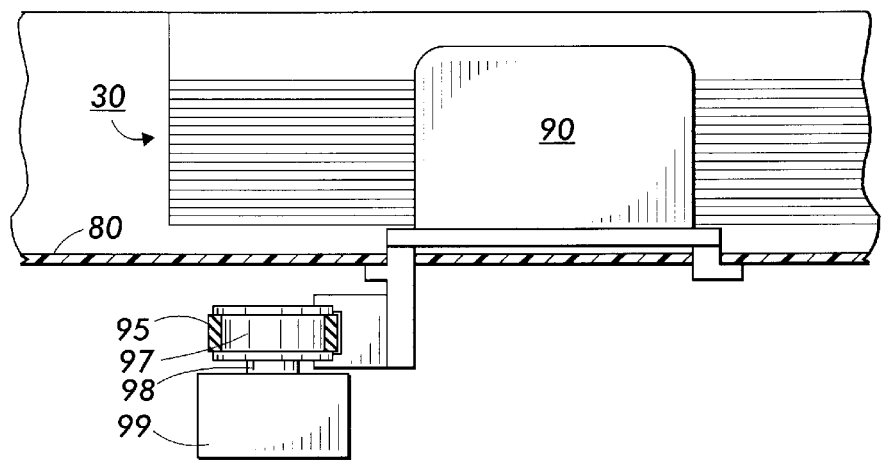
FIG. 3

| ID# | | Orientation | In Direction of Feed Length (mm) | Width (mm) | DOCUMENT WIDTH | | | DOCUMENT LENGTH | | | RATIO+RANGE |
|---|---|---|---|---|---|---|---|---|---|---|---|
| | | | | | $V_{IN}$ | $V_{OUT}$ | $(\frac{V_{OUT}}{V_{IN}})*100\%$ | <205mm A | 205>X<317mm B | >317mm C | |
| 1 | Statement (5.5"x8.5") | SEF | 215.9 | 139.7 | 5 | 0.00 | 0.00 | - | B | - | 0+B |
| 2 | A5A / A5E | SEF | 210 | 148 | 5 | 0.26 | 5.28 | - | B | - | 5.28+B |
| 2 | A6 | LEF | 105 | 148 | 5 | 0.26 | 5.28 | A | - | - | 5.28+A |
| 2 | PostCard | LEF | 100 | 148 | 5 | 0.26 | 5.28 | A | - | - | 5.28+A |
| 3 | B5E | SEF | 250 | 176 | 5 | 1.15 | 23.08 | - | B | - | 23.08+B |
| 3 | B6E | LEF | 125 | 176 | 5 | 1.15 | 23.08 | A | - | - | 23.08+A |
| 4 | B5A | SEF | 257 | 182 | 5 | 1.34 | 26.89 | - | B | - | 26.89+B |
| 4 | B6A | LEF | 128 | 182 | 5 | 1.34 | 26.89 | A | - | - | 26.89+A |
| 5 | A4A / A5E | SEF | 297 | 210 | 5 | 2.23 | 44.69 | - | B | - | 44.69+B |
| 5 | A5A / A5E | LEF | 148 | 210 | 5 | 2.23 | 44.69 | A | - | - | 44.69+A |
| 6 | 8.5" x 12.4" | SEF | 315 | 215.9 | 5 | 2.42 | 48.44 | - | B | - | 48.44+B |
| 6 | 8.5" x 13" | SEF | 330.2 | 215.9 | 5 | 2.42 | 48.44 | - | - | C | 48.44+C |
| 6 | Legal (8.5"x14") | SEF | 355.6 | 215.9 | 5 | 2.42 | 48.44 | - | - | C | 48.44+C |
| 6 | Letter (8.5"x11") | SEF | 279.4 | 215.9 | 5 | 2.42 | 48.44 | - | B | - | 48.44+B |
| 6 | Statement (5.5"x8.5") | LEF | 139.7 | 215.9 | 5 | 2.42 | 48.44 | A | - | - | 48.44+A |
| 7 | B4E | SEF | 353 | 250 | 5 | 3.51 | 70.12 | - | - | C | 70.12+C |
| 7 | B5E | LEF | 176 | 250 | 5 | 3.51 | 70.12 | A | - | - | 70.12+A |
| 8 | Accounting (10"x14") | SEF | 355.6 | 254 | 5 | 3.63 | 72.66 | - | - | C | 72.66+C |
| 9 | B4 | SEF | 364 | 257 | 5 | 3.73 | 74.57 | - | - | C | 74.57+C |
| 9 | B5 | LEF | 182 | 257 | 5 | 3.73 | 74.57 | A | - | - | 74.57+A |
| 10 | Ledger (11"x17") | SEF | 431.8 | 279.4 | 5 | 4.44 | 88.81 | - | - | C | 88.81+C |
| 10 | Letter (8.5"x11") | LEF | 215.9 | 279.4 | 5 | 4.44 | 88.81 | - | B | - | 88.81+B |
| 11 | A3 | SEF | 420 | 297 | 5 | 5.00 | 100.00 | - | - | C | 100.00+C |
| 11 | A4 | LEF | 210 | 297 | 5 | 5.00 | 100.00 | - | B | - | 100.00+B |

*FIG. 6*

METHOD OF USING INPUT SIZE DETERMINATION FOR IMPROVEMENTS IN PRODUCTIVITY AND IMAGING

BACKGROUND OF THE INVENTION

The present invention relates generally to cut-sheet handling equipment and more specifically to a method of using automatic size sensors in the document input feeder of a scanner, copier, or similar image forming system adapted to handle documents of varying sizes. It is believed that the technology also has general applicability to package handling and other article handling equipment.

In many imaging systems that input documents of varying sizes such as scanners, copiers, and fax systems, it is necessary or desirable that the machine obtain information regarding the size of the input documents. For instance, both U.S. Pat. No. 4,669,863 issued to Yoshiura et al. and U.S. Pat. No. 5,150,224 issued to Mizude et al. disclose systems that coordinate size-selection of copy substrates with the size of input documents and of the amount of image magnification, if any, used in the job. Additionally, most current printers and copiers with multiple output bins provide that one bin is selected as a default such that in the absence of a specific alternate selection by the operator, substrates from that bin are fed into the printer or copier for imaging. If input documents are of different size from the default substrate, then the printed image is often cropped or, alternatively, too small for the output substrate. It would be advantageous if the substrate bin default selection was automatically adjusted to select the bin with the substrate size that most closely corresponds in size to the input documents. Alternatively, it would be advantageous to automatically detect the size of input documents in order to adjust the amount of optical or digital magnification in order to fit the input image properly onto the selected output substrate. It would also be advantageous to automatically detect the size of input documents within the feeder apparatus rather than during image processing in order that First Copy Time Out can be reduced by commencing transport of the correct copy substrate earlier in the imaging sequence. In digital reprographic devices, it would be advantageous to rotate digital imaging information when the axis of the input documents is perpendicular to the axis of the selected copy substrate.

Prior art techniques have attempted to realize a few of the above advantages of automated document size sensing. For instance, in U.S. Pat. No. 5,150,224, issued to Mizude et al., an input document size sensor is disclosed that uses a series of light emitters and receptors located underneath a glass platen. Mizude discloses that such information about input document size can be used to compute the amount of magnification, if any, required to fit the input image onto the selected output substrate. However, as acknowledged in Mizude, such fixed arrays of a few sensors are useful in matching input document sizes to one of only a select number of standard input sizes. Irregular sizes cannot easily be determined. Moreover, the number of sensors together with the complicated wiring and logic circuits associated with techniques similar to the disclosures of Mizude lead to more costly and complicated assembly procedures and to less reliability. See also U.S. Pat. No. 4,908,672, issued to Ito, where an unspecified document size sensor is used to help select magnification and a preferred selection of copy substrates.

More attention has been devoted in the prior art to techniques for automatically detecting the size of copy substrates loaded in one or more copy substrate paper trays. In U.S. Pat. No. 5,290,225, issued to Saito, substrate length is detected by measuring the travel time from lead to trailing edge of the substrate as it is transported from the paper tray to the imaging station. In both U.S. Pat. No. 5,328,166, issued to Hokamura, and U.S. Pat. No. 5,188,351, issued to Gysling, apparatus is disclosed for automatically detecting the size of paper loaded into a removable paper cassette by detecting the position of an adjustable paper guide. In Hokamura, sensors are disposed on the printer underneath the removable cassette such that they detect the position of the paper guide(s) in order that the printer processor can determine which of several predetermined sizes are loaded. See also U.S. Pat. No. 5,110,106 issued to Matsumura et al. In Gysling, a cam-operated shaft is moved up or down in response to position shifts of the paper guide(s). An electrically active wiper blade is attached to the movable end of the shaft such that shifts in the shaft position trigger result in electrical connections with one of a series of electrical detectors.

In U.S. Pat. No. 5,360,207, issued to Rauen et al., six embodiments are disclosed that are directed toward coupling of a substrate paper guide to a linear or rotary encoder or potentiometer. As a paper guide is manually nudged against a stack of copy substrates, its position is converted by the encoder or potentiometer into a signal indicative of that position. A processor then converts the signal into a read-out of the paper size. As explained in Rauen, information concerning the size of copy substrates can be used to maximize system throughput by enabling improved pitch control and by enabling instructions to be given that direct the operator to re-orient copy substrates into the direction that will maximize system throughput. Although the invention of Rauen has been known in the art for a number of years, it is believed that the invention has not been used in a commercial device. The reasons for this lack of use appear to be the relatively high cost of linear encoder apparatus suitable for commercial use and, for less expensive variable resistance potentiometers, inconsistent readings due to variations with temperature, variations between units, and variations over time as parts wear.

In U.S. Pat. No. 4,585,332, issued to Shenoy, a paper tray with as few as three fixed sensors is disclosed. That patent teaches that the number of different size sheets that can be detected is N+2, where "N" stands for the number of sensors.

Relevant portions of each of the above references are hereby incorporated by reference. None of these references, however, disclose apparatus for automatically detecting many sizes of sheets using only a few reliable and inexpensive components. Also, none of the above references disclose methods by which an image forming device may use automatically generated document size data to improve system throughput, automatically select copy substrates, and enhance image processing for input documents.

SUMMARY OF THE INVENTION

In accordance with one aspect of the presently disclosed invention there is provided a method in an imaging system for selecting a copy substrate tray from a plurality of trays containing copy substrates with differing dimensions, comprising: identifying a first dimension and a second dimension of the copy substrate loaded into each tray; using at least one adjustable guide to determine a first dimension of the input document; identifying a second dimension of the input document; determining whether the dimensions of the input document are within a specified range of the dimensions of a copy substrate loaded into the trays; in response to a determining that the dimensions of the input document are within the specified range, selecting the tray containing the copy substrate; and, in response to determining that the dimensions of the input document are not within the range, making a preliminary selection of the tray containing a copy substrate with dimensions that most correspond to the dimensions of the input document.

In accordance with another aspect of the presently disclosed invention there is disclosed a method in an imaging system that prints information obtained from an input document onto a copy substrate. The method comprises: using at least one adjustable guide to determine a first dimension of the input document; identifying a second dimension of the input document; identifying a first dimension and a second dimension of the copy substrate; determining whether the dimensions of the input document are within the specified range of the dimensions of the copy substrate; in response to determining that the dimensions of the input document are within the specified range, printing the information as obtained from the input document; and, in response to determining that the dimensions of the input document are not within the specified range, making adjustments to the information prior to printing the information onto the copy substrate.

BRIEF DESCRIPTION OF THE DRAWINGS

Other aspects of the present invention will become apparent as the following description proceeds and upon reference to the drawings, in which:

FIG. 2 is a perspective view showing the bottom side of one embodiment of the document feeder apparatus shown in FIG. 1;

FIG. 3 is a fragmentary elevational view of the document feeder apparatus shown in FIGS. 1 and 2;

FIG. 6 is a chart showing relationships between the dimensions of common sizes of documents and values measured using the apparatus of the present invention;

DETAILED DESCRIPTION OF THE DRAWINGS

While the present invention will hereinafter be described in connection with its preferred embodiments and methods of use, it will be understood that it is not intended to limit the invention to these embodiments and method of use. On the contrary, the following description is intended to cover all alternatives, modifications, and equivalents, as may be included within the spirit and scope of the invention as defined by the appended claims.

As an exemplary application of the present invention, its application within an electrophotographic print engine will herein be described. In as much as the art of electrophotographic printing is well known, the various process stations employed in the FIG. 10 printing machine will be shown hereinafter schematically and their operation described briefly with reference thereto.

Figure 10:
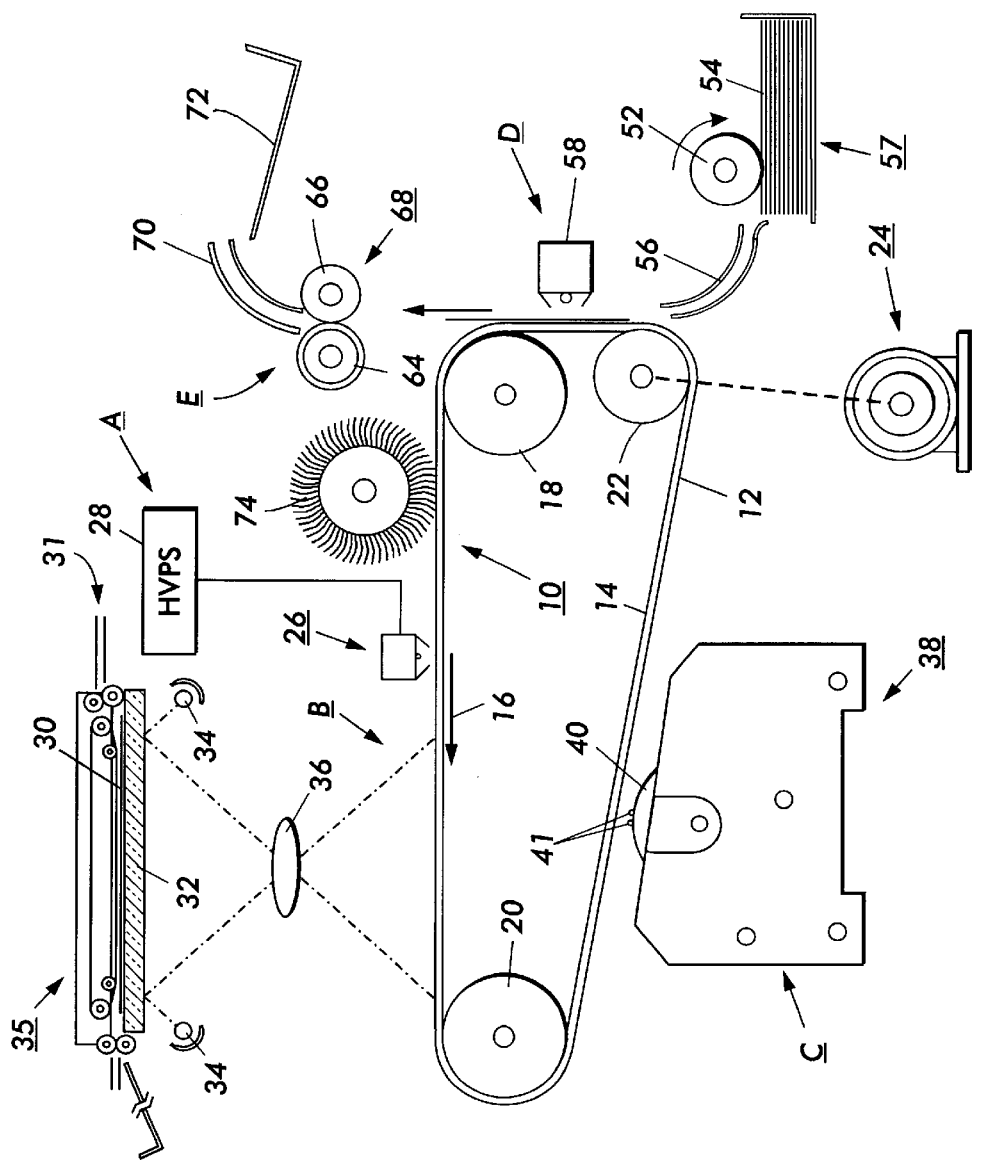
FIG. 10 is a schematic elevational view of an exemplary electrophotographic printing machine incorporating the document feeder apparatus of the present invention.

Referring initially to FIG. 10, there is shown an illustrative electrophotographic printing machine incorporating the apparatus of the present invention therein. The printing machine incorporates a photoreceptor 10 in the form of a belt having a photoconductive surface layer 12 on an electroconductive substrate 14. Preferably the surface 12 is made from a selenium alloy. The substrate 14 is preferably made from an aluminum alloy which is electrically grounded. The belt is driven by means of motor 24 along a path defined by rollers 18, 20 and 22, the direction of movement being counter-clockwise as viewed and as shown by arrow 16. Initially a portion of the belt 10 passes through a charge station A at which a corona generator 26 charges surface 12 to a relatively high, substantially uniform, potential. A high voltage power supply 28 is coupled to device 26. After charging, the charged area of surface 12 is passed to exposure station B. At exposure station B, an original document 30 is placed face down upon a transparent platen 32. Placement of original document 30 may be accomplished using an automatic document handling system 35 which, as explained below, utilizes the present invention. Lamps 34 flash light rays onto original document 30. The light rays reflected from original document 30 are transmitted through lens 36 to form a light image thereof. Lens 36 focuses this light image onto the charged portion of photoconductive surface 12 to selectively dissipate the charge thereon. This records an electrostatic latent image on photoconductive surface 12 which corresponds to the informational areas contained within original document 30. After the electrostatic latent image has been recorded on photoconductive surface 12, belt 10 advances the latent image to development station C. At development station C, a development system, develops the latent image recorded on the photoconductive surface. Preferably, development system includes a donor roller 40 and electrode wires positioned in the gap between the donor roll and photoconductive belt. Electrode wires 41 are electrically biased relative to donor roll 40 to detach toner therefrom so as to form a toner powder cloud in the gap between the donor roll and photoconductive surface. The latent image attracts toner particles from the toner powder cloud forming a toner powder image thereon. Donor roll 40 is mounted, at least partially, in the chamber of developer housing 38. The chamber in developer housing 38 stores a supply of developer material. The developer material is a two component developer material of at least magnetic carrier granules having toner particles adhering triboelectrically thereto. A transport roller disposed interiorly of the chamber of housing 38 conveys the developer material to the donor roller. The transport roller is electrically biased relative to the donor roller so that the toner particles are attracted from the transport roller to the donor roller. After the electrostatic latent image has been developed, belt 10 advances the developed image to transfer station D, at which a copy substrate 54 is advanced from substrate tray 57 by roll 52 and guides 56 into contact with the developed image on belt 10. The sheet feeder apparatus of the present invention may be utilized in connection with copy substrates 54.

A corona generator 58 is used to spray ions on to the back of the substrate so as to attract the toner image from belt 10 to the substrate. As the belt 10 turns around roller 18, the copy substrate 54 is stripped therefrom with the toner image thereon. After transfer, the copy substrate is advanced by a conveyor (not shown) to fusing station E. Fusing station E includes a heated fuser roller 64 and a back-up roller 66. The substrate passes between fuser roller 64 and back-up roller 66 with the toner powder image contacting fuser roller 64. In this way, the toner powder image is permanently affixed to the substrate. After fusing, the substrate advances through chute 70 to catch tray 72 for subsequent removal from the printing machine by the operator. After the substrate is separated from photoconductive surface 12 of belt 10, the residual toner particles adhering to photoconductive surface 12 are removed therefrom by a rotatably mounted fibrous brush 74 in contact with photoconductive surface 12. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine incorporating the automatic input document size sensor of the present invention therein. Although the apparatus of the present invention is particularly well adapted for use in an electrophotographic reproducing machine as shown in FIG. 10, it will become apparent from the following discussion that the input document size sensor of the present invention is equally well suited for use in a wide variety of scanners, printers, and other devices that feed varying sizes of input documents into imaging-related devices.

Figure 1:
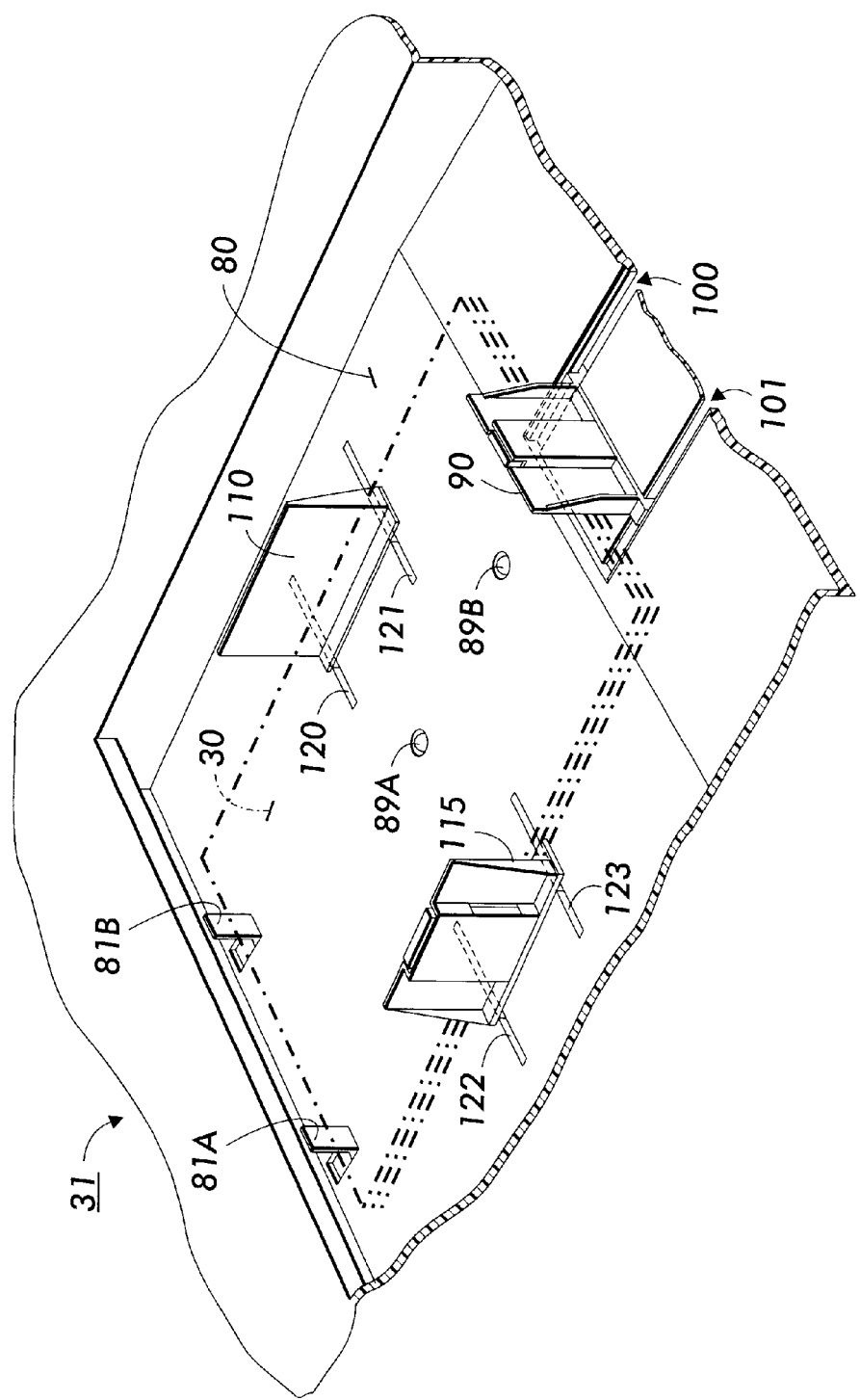
FIG. 1 is a perspective view of the apparatus of the present invention showing the top side of an automated document feeder tray.

Moving now to the particular features of the document feeder apparatus of the present invention, reference is made to FIGS. 1, 2, and 3 wherein a first embodiment of the present invention is depicted. FIG. 1 is an elevated perspective view of the top side of input document feeder tray 31. Such tray may be part of an automated multi-sheet document handling system of the type shown as 35 in FIG. 10 or may be part of a single sheet document feeder assembly. The base of tray 31 comprises flat surface 80 onto which one or more input documents 30 are placed. A front edge stop is formed by a pair of fingers, 81a and 81b, which are retracted as the input documents are driven into the feeder apparatus. Adjustable guide 90 is slidably mounted onto flat surface 80 through slots 100 and 101. It will be understood by those knowledgeable in the art that adjustable guide 90 can be nudged against the edge of input documents 30 by operation of a human operator or, if the input documents are rigid enough, by force of an electrical motor (not shown) which is actuated after placement of input documents 30 onto flat surface 80. When positioned against the edge of input documents 30, slidable movement of adjustable guide 90 is stopped, and its resting position relative to fingers 81a and 81b is a function of the length dimension of input documents 30. This length dimension measures the distance an input document must travel between its lead and its trail edge. As will be explained below, accurate measurement of this length dimension enables several methods of the present invention.

Turning now to FIG. 2, bar member 90' comprises the portion of substrate guide 90 that extends through slots 100 and 101 below flat surface 80 and that slidably moves within slots 100 and 101 as described above. Bar member 90' is fixedly connected to flexible endless belt 95 at point 91. Flexible endless belt 95 is rotatably mounted on pulleys 96 and 97 such that slidable movements of bar member 90' result in rotational displacement of belt 95 by distances corresponding to the distance in which bar member 90' has been moved. Pulley 97 is frictionally connected to belt 95, and as belt 95 is rotatably displaced, pulley 97 rotates by an angular displacement proportional to the distance of displacement of belt 95.

FIG. 3 is an elevated side view of the document feeder apparatus of the embodiment shown in FIGS. 1 and 2 as viewed looking in the direction of the length dimension of input documents 30 toward adjustable guide 90. Below tray bottom 80, shaft 98 is rigidly mounted onto pulley 97 and thereby rotatably connects pulley 97 to variable resistance rotary potentiometer 99. Pulley 97 and shaft 98 thereby serve as a rotary turn pot. Endless belt 95 wraps around pulley 97 to convert slidable movement of adjustable guide 90 into rotary movement of turn pot 98. This rotation of turn pot 98 is directly proportional to the amount of displacement of adjustable guide 90.

Returning now to FIG. 1, a second apparatus for determining the dimensions of an input document is shown. Parallel input document adjustable guide 110 is mounted in slots 120 and 121, and adjustable guide 115 is mounted parallel to guide 110 in slots 122 and 123. When nudged against the edge of input documents 30, the distance between adjustable guides 110 and 115 is a measurement of the width of input documents 30.

Figure 4:
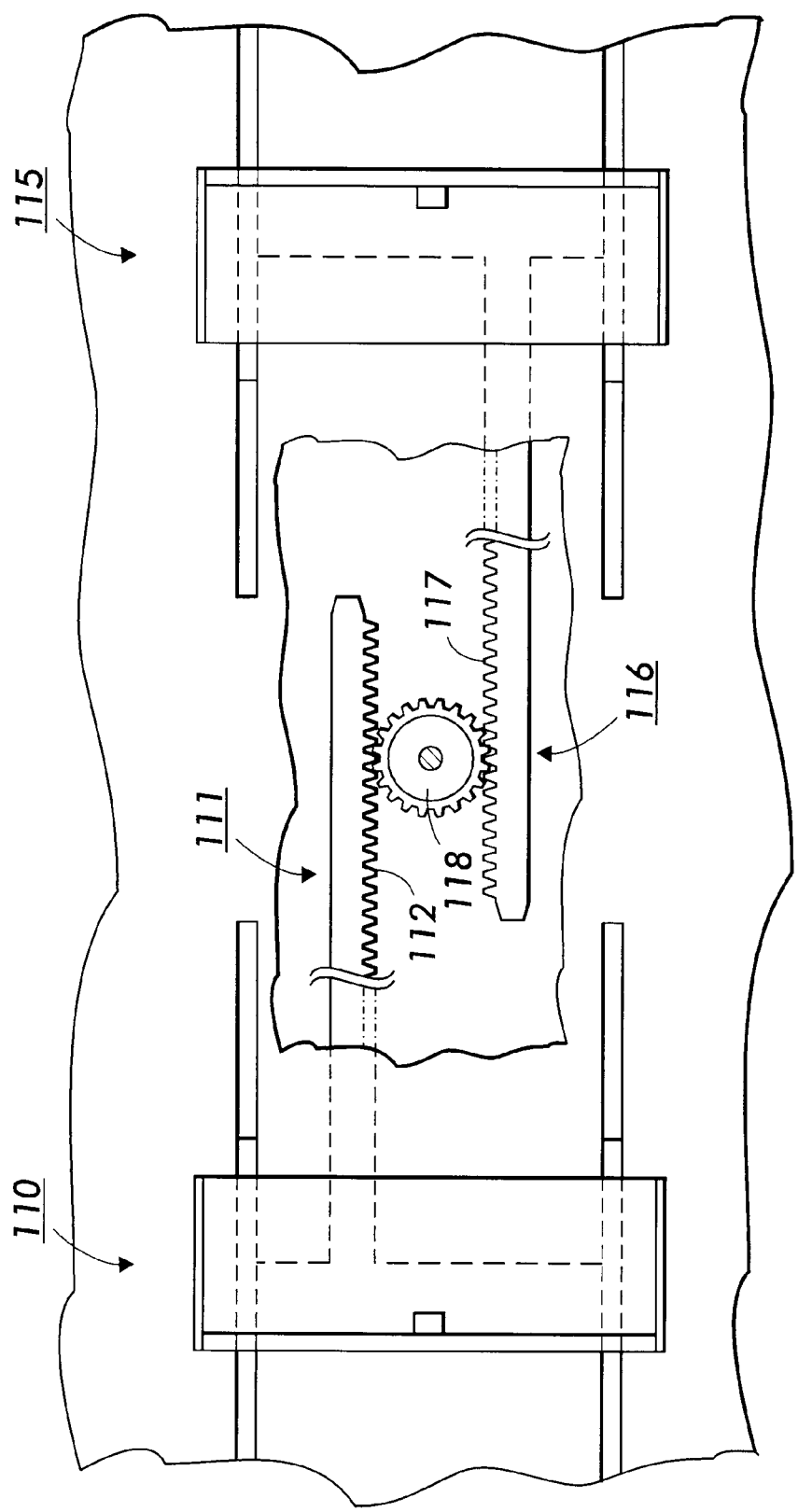
FIG. 4 is an elevational view of another embodiment of the present invention showing the bottom side of an automated document feeder tray.

FIG. 4 shows the bottom portion of the apparatus of the present invention viewed through a cutout in flat surface 80. Adjustable guides 110 and 115 extend through slots in flat surface 80 in the same manner as described above in relation to adjustable guide 90. Extending perpendicularly from the bottom portion of adjustable guide 110 is rack 111. Similarly, rack 116 extends perpendicularly from the bottom portion of adjustable guide 115. Racks 111 and 116 include gear teeth 112 and 117, respectively, arranged such that gear teeth 112 and 117 face each other. Pinion gear 118 is approximately centered between adjustable guides 110 and 115 such that teeth on pinion gear 118 simultaneously engage teeth 112 and 117. Thus, movement of either adjustable guide 110 or 115 results in rotation of pinion gear 118, thereby imparting essentially equal and opposite movement to the other adjustable guide. In other words, if adjustable guide 110 is moved toward the center of flat surface 80, then adjustable guide 115 also moves toward the center by a like amount. In the above manner, adjustable guides 110 and 115 cooperate to keep the input document 30 centered between the adjustable guides.

In a manner as explained above in relation to FIG. 3, pinion gear 118 serves as a turn pot to a variable resistance potentiometer (not shown in FIG. 4) which functions in the same manner as explained above in respect to potentiometer 99 shown in FIGS. 2 and 3.

Those skilled in the art will recognize that the function of potentiometer 99 can be performed by any of the linear or rotary encoder devices disclosed in Rauen et al. as well as many versions of variable resistance devices such as variable bar resisters and Field Effect Transistors. Each of these and similar devices is capable of producing a signal that can characterize the linear displacement of adjustable guides 90, 100, and 115 as such guides are shown in FIG. 1. Also, those skilled in the art will recognize that although the adjustable guide 90 was described as measuring the length dimension of input documents while adjustable guides 110 and 115 were described as measuring the width dimension of input documents, the placement of these apparatus could be interchanged.

Figure 5:
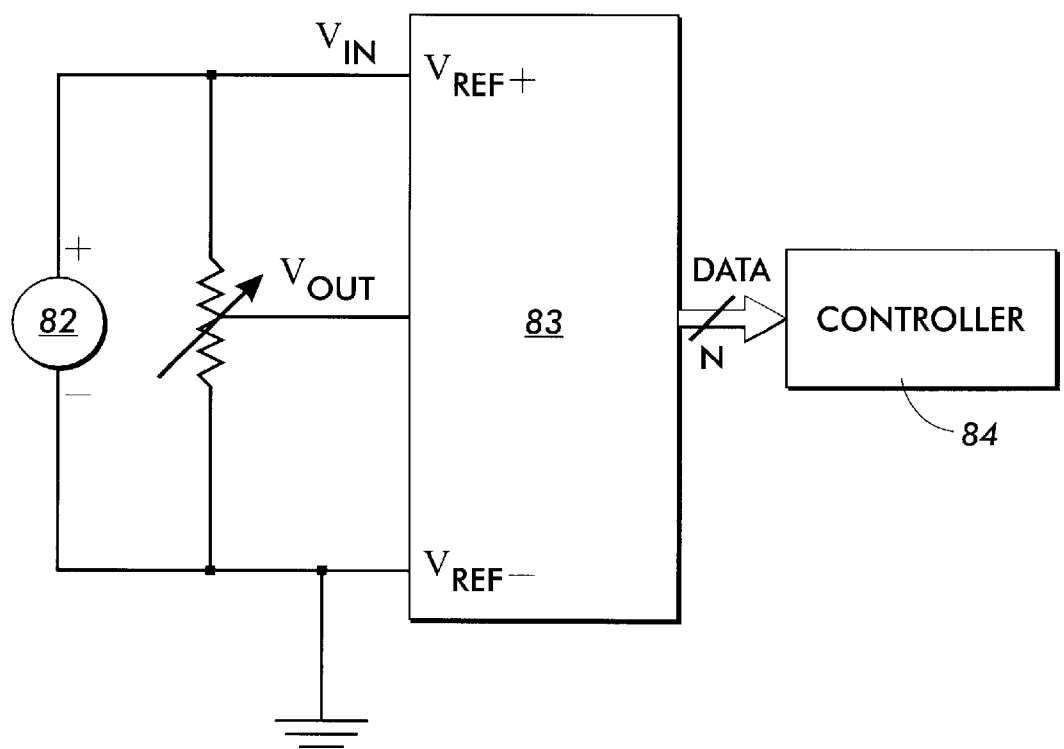
FIG. 5 is a simplified circuit diagram of one embodiment of the present invention using a variable resistor potentiometer.

One problem with variable resistance potentiometers that has inhibited their commercial use in document handling systems until now has been that without relatively expensive components, both potentiometers and the power supply that provides current to them tend to vary in performance unit to unit and over time as they age. Performance of potentiometers and power supplies typically also varies as a function of temperature. Although voltage and current regulators could be added to a circuit containing a potentiometer sensor, such regulators also increase cost and complexity while decreasing the reliability of the sensing apparatus. The present invention therefore provides a solution to the above problems. Instead of using the absolute value of reduced voltage as measured through a potentiometer, the present invention computes the ratio between output voltage ($V_{out}$) and input voltage ($V_{in}$). As described above, $V_{out}$ is determined by the position of the relevant adjustable document guides. $V_{in}$ is the reference voltage originating from the power supply. FIG. 5 is a simplified circuit diagram showing power supply 82, potentiometer 99, and voltage sensor 83. As shown, voltage sensor 83 delivers values for $V_{in}$ and $V_{out}$ with "n" bits of resolution to a controller 84 where the $V_{out}/V_{in}$ ratio is determined.

Returning again to FIG. 1, yet another apparatus for determining a dimension of an input document is shown. As explained below, this apparatus enables an advantageous combination of the precise dimension measurement apparatus described above together with a minimal number of conventional position detectors similar to those described in Mizude et al and Shenoy. Specifically, this embodiment contemplates that conventional position detectors 89a and 89b are placed to measure approximate length dimensions of input documents 30. Adjustable guide 90 and slots 100 and 101 are not necessary and would presumably be eliminated for cost and convenience reasons. Instead, position detectors 89a and 89b operate to determine which of several ranges the input length falls into. For instance, if position detector 89a is set at 205 mm from retractable fingers 81a and 81b while position detector 89b is set at 317 mm from such retractable fingers, then length is determined by such position detectors to be one of the following: 1) shorter than 205 mm, 2) between 205 and 317 mm or 3) longer than 317 mm. When combined with an accurate measure of the width dimension enabled by using the size sensors communicating with the adjustable guides as described above, virtually all common sizes of input documents can be determined.

FIG. 6 is a chart showing the most common sizes of input documents for a document feeder apparatus with a 300 mm width capability. All common sizes with a width of 300 mm or shorter are arranged by both Long Edge First (LEF) and Short Edge First (SEF). As shown, the combination of $V_{out}/V_{in}$ ratios for the width dimension of each size plus selection of one of the three ranges of length dimensions results in unique identifications for all except the following three pairs of sizes: 1) A6 and postcard sizes; 2) 8.5"×13" and 8.5×14"; and 3) 8.5"×11" (B4) size and 8.5"×12.4. It is contemplated that for these pairs, the controller would make a default selection of the size that is expected to occur most frequently unless the operator overrides such default selection. With more length position detectors, even the above pairs can easily be differentiated.

In prior art input document feeders that use arrays of magnetic or light position detectors for both length and width dimensions, the space between position detectors is typically too large to differentiate between sizes such as A4 and B4 and between most other imperial and metric equivalencies. Unless additional position detectors are added that increase cost and complexity, an operator is typically required to specify whether the system is to be configured for imperial or for metric sizes. With the increased accuracy of the present invention, such operator involvement is no longer necessary. Moreover, if the imaging system is loaded with imperial size copy substrates and the $V_{out}/V_{in}$ input ratio indicates that the input documents are metric sizes or if the reverse situation occurs, then the system can be configured to notify the operator of such discrepancy before printing. Thus, contrary to the teachings of Shenoy, a size sensor that measures at least one dimension of a sheet with the accuracy of the present invention enables only three sensors to identify all of the sheet sizes listed on FIG. 6 plus others that do not introduce duplicate identifications. Even with expected variations in paper dimensions of ±1 mm from nominal sizes and with expected machine tolerances, both of the adjustable guide apparatus shown in FIG. 1 are believed able to consistently discriminate differences as shall as 6 mm. The embodiment using only one adjustable guide 90 appears able to consistently discriminate differences smaller than 4 mm.

As shown in FIG. 6, placement of $V_{out}/V_{in}$ ratios of widths and the ranges of length into a look-up table accessible to a controller enables accurate and automated identification of the most common sizes of input documents. For instance, as input documents are placed into the document feeder, the measured $V_{out}/V_{in}$ ratio and length determination is matched against the closest value in a look-up table comprising values expected from the listed common sizes of input documents. In another embodiment, $V_{out}/V_{in}$ ratios that fall within a specified range from a ratio value in a look-up table are rounded to that look-up value whereas $V_{out}/V_{in}$ ratios that fall outside of all of the specified ranges are interpolated into dimensional values different from the listed common size documents. Yet another embodiment provides for recalibrating the ratios of a look-up table each time the measured $V_{out}/V_{in}$ ratio falls within a specified range of the then-current ratios listed in the look-up table for the common sizes of input documents. For example, if a look-up table based on the chart of FIG. 6 contains an initial ratio for an 11 inch width of 48.44 and if the processor's algorithm provides for recalibration if the currently measured ratio is within +/−0.10, then if the measured $V_{out}/V_{in}$ ratio is 48.51, the look-up table is recalibrated such that the new look-up ratio value expected from an 11 inch wide input document is 48.51.

Although the present invention is shown in relation to an input feeder, both the above described apparatus and methods may be used to determine the size of copy substrates in copy sheet trays. For purposes of this disclosure, the term "sheet" shall mean either or both an input document or a copy substrate.

Figure 7:
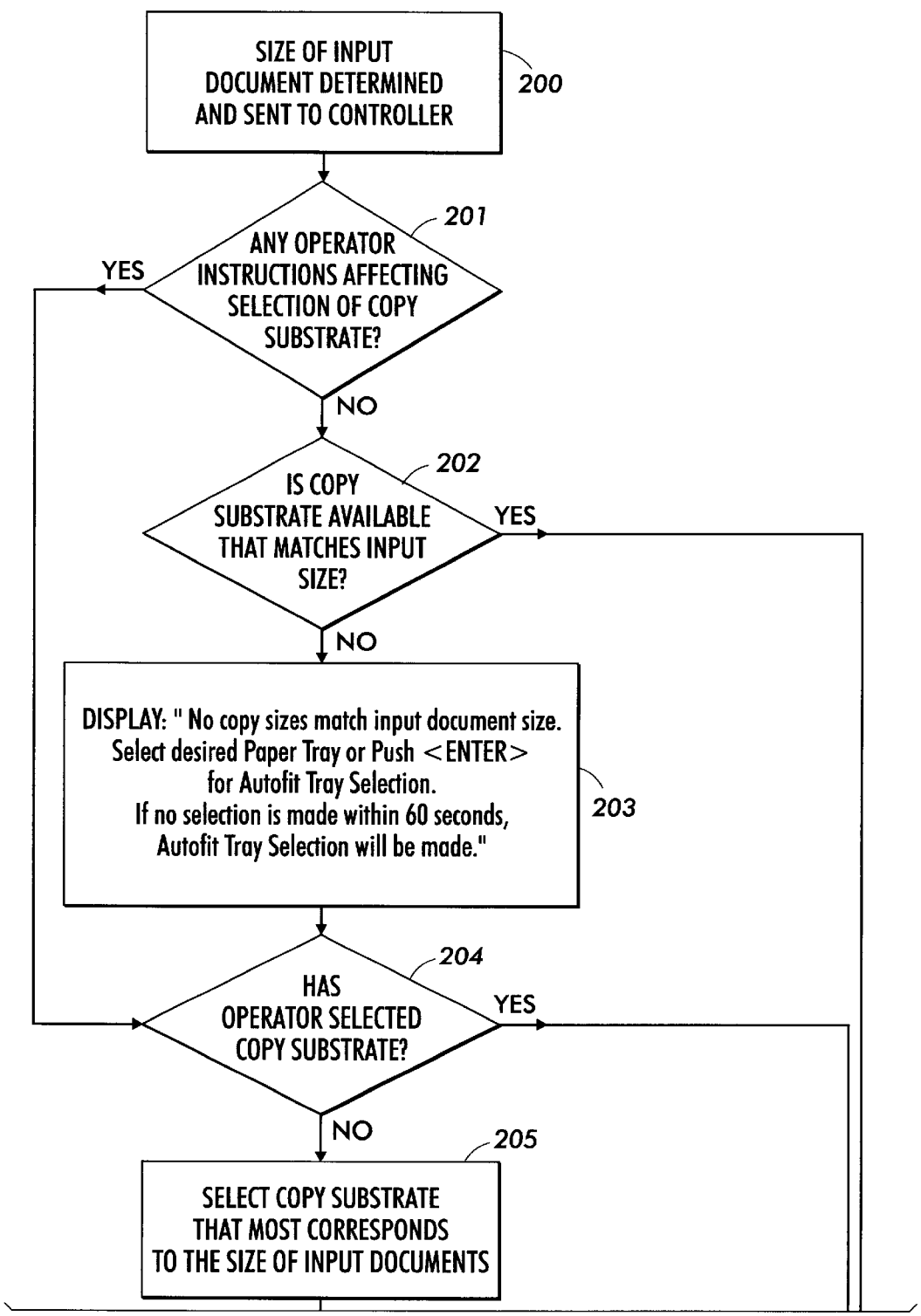
FIG. 7 is a flow chart showing methods for improving productivity and image quality using the apparatus of the present invention.
Figure 8:
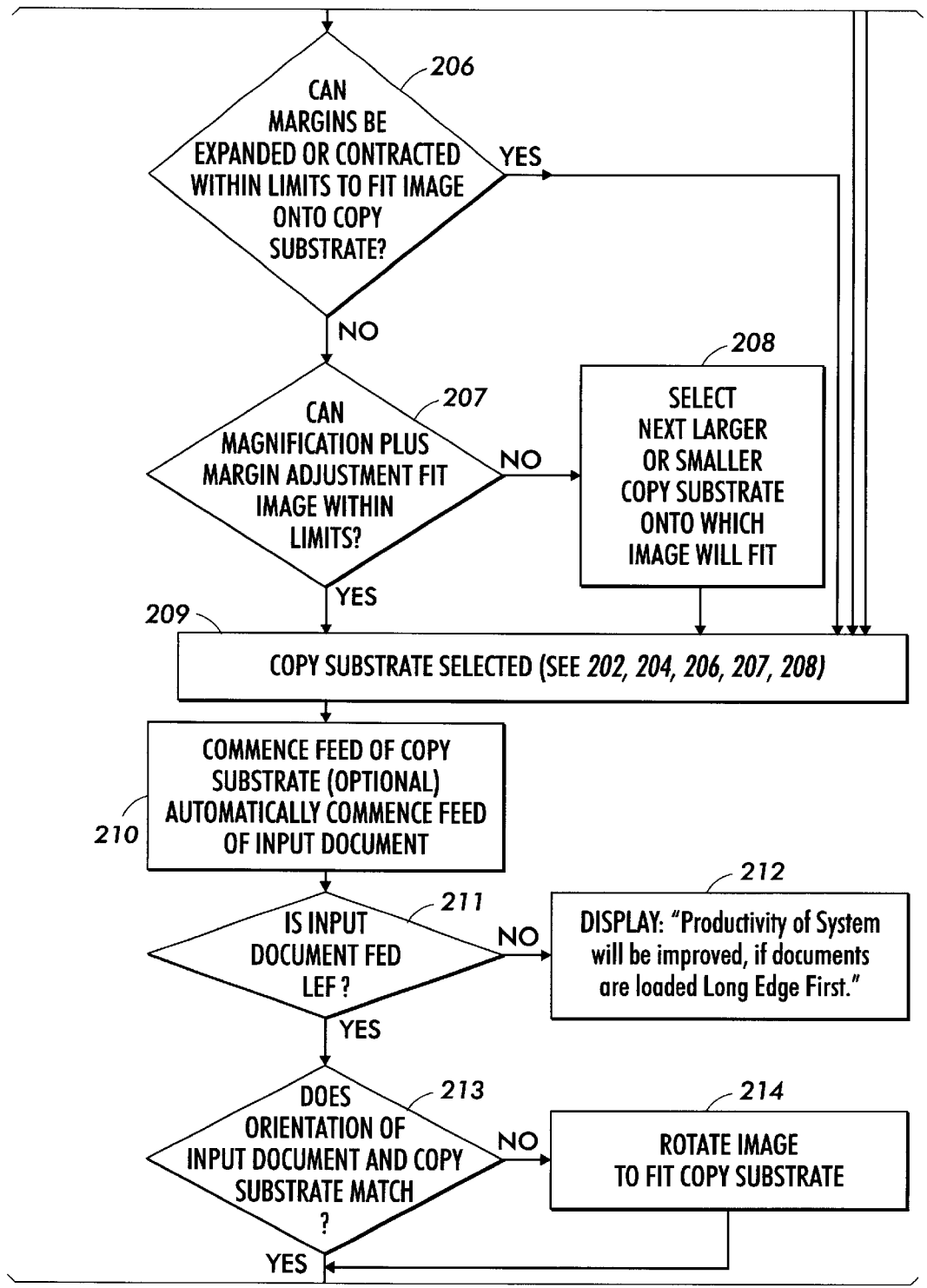
FIG. 8 is a continuation of the flow chart in FIG. 7.
Figure 9:
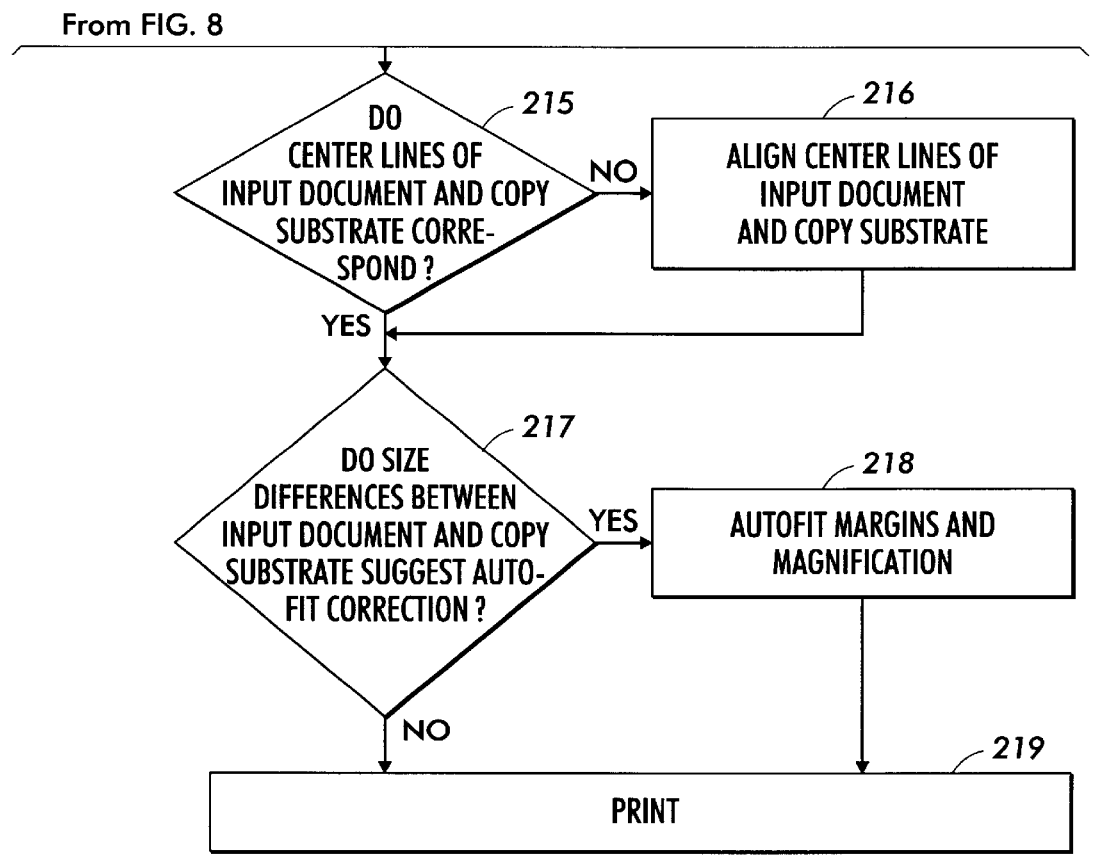
FIG. 9 is a continuation of the flow chart in FIGS. 7 and 8.

Turning now to FIGS. 7–9, a flow chart is shown that discloses features that become enabled within an imaging system once an accurate identification of the size of input documents becomes possible. Although such features are enabled if a human operator enters the size data for input documents, it is anticipated that an automated size identification apparatus such as described above makes the features disclosed in FIGS. 7–9 more reliable and practical.

Each of the steps disclosed within FIGS. 7–9 will generally be performed within one or more of the CPU controllers that control functions within the imaging system. At step 200, a sequence is begun which leads to selection of a preferred copy substrate onto which printing will occur. At step 201, the operator has been allowed the opportunity to input selections affecting the choice of copy substrate, and the controller determines whether the operator has inserted any such special processing instructions. For instance, the operator may have selected a magnification operation or may have directly selected the copy substrate tray that will supply copy substrates for the job. Assuming that no such instructions from the operator are detected, then at step 202 the controller inquires whether a copy substrate size is available that essentially matches the identified dimensions of the input document. A match is deemed essentially made if the currently sensed dimensions are within a specified range of the values for the comparable dimensions of an available copy substrate. If the answer is affirmative, then this copy substrate is selected as shown at step 209. If the controller cannot identify a match between input dimensions and copy substrate dimensions, then, as shown at step 203, the controller directs that the following message be displayed on the system control panel:

No copy sizes match input document size. Select desired paper tray or push <Enter> for AutoFit tray selection. If no selection is made within 60 seconds, AutoFit tray selection will be made.

Step 204 represents the opportunity for an operator to make the suggested selection of a substrate tray. Assuming no tray selection is made, then at step 205 the controller selects the copy substrate that most corresponds to the size of the input documents. At step 206, the controller determines whether the image file can be fit onto the substrate size selected in step 205 by shrinking or expanding the margins of the document within specified limits for such expansion or contraction. If the margins must be expanded or contracted too much in order for the image to fit onto the copy substrate, then, at step 207, the controller determines whether a magnification adjustment combined with a margin adjustment renders a result without undue distortions. If too much adjustment to margins or magnification must be made, then, at step 208, the next largest or smallest size of copy substrate is selected. Step 209 represents the output of step 208 and of each of steps 202, 204, 206, and 207 wherein selection of an appropriate copy substrate has been made by either the controller or by an operator.

Once both the dimensions of input documents are determined and a copy substrate with known dimensions has been selected, then a number of image processing and system throughput improvements become enabled. At step 210, first copy out time (FCOT) is improved over conventional systems by commencing the transport of a copy substrate even before the input document leaves its input tray. Since copy substrate selection can now be automated using the present invention while the input document rests in the input tray, transportation, charging, and other steps to move and prepare the copy substrate for imaging can occur as soon as selection of a copy substrate is made. In conventional systems that provide for automatic selection of copy substrate, the sensing of the size of input documents does not occur until after the input documents are fed past a series of position and timing sensors within the feeder apparatus itself. Even for conventional systems that do not provide for automatic selection of copy substrates, the present invention would eliminate the need for a pause in the system to allow the operator to manually select a copy substrate different from the default selection. Indeed, the input document feeder and copy substrate feeders can be programmed to begin feeding operations after the adjustable guides are moved into place without the need for an operator to enter a <START>command. By enabling an automated selection of copy substrate, the present invention thus results in improved FCOT.

At step 211, the controller compares the sensed width and length dimensions and determines whether the input document is being fed into the document feeder LEF. This becomes important for high production systems since both scanning and imaging times can be decreased if use of the process width of the imaging system is maximized while imaging length is minimized. In the event that the controller determines that the input document is being fed SEF instead of LEF, the controller pauses the system and, as shown in step 212, asks the operator if he or she wishes to change the orientation of the document feeder. Alternatively, the imaging system may be configured not to pause the document feeder but simply to notify the operator that productivity can be improved in future operations by loading input documents in LEF orientation.

At step 213, the controller inquires whether the orientation of the input document is the same as the copy substrate. Assuming that the image forming system is a digital system that commences with a digital scanner, then, if the orientation of input documents and copy substrates differs, the controller directs at step 214 that the digital image file be reoriented for proper placement onto the copy substrate. In addition to eliminating the printing of images with incorrect orientations with the associated improper cropping of images, a major advantage of the feature identified in steps 209 and 210 is that only one copy substrate tray need be filled with a particular size of substrate. This eliminates the need to use two substrate trays loaded with the same size substrate in order to have both SEF and LEF orientations available for printing. As a result, even more sizes of substrates can be loaded into an image forming system, thereby increasing system flexibility and productivity.

At step 215, the controller inquires whether the center lines of the input document and copy substrate correspond in position such that the image will be centered on the copy substrate when printed. For instance, if the input document is B4 size and the selected copy substrate is A4, then imaging operations that are conventional to the prior art would generally align the copied image in accordance with the margins of the original document. The image would therefore be printed in a non-centered manner. At step 216, the controller identifies the center of the input document after identifying its dimensions and then provides this centering information to the image processing algorithms in order that the printed image be centered on the copy substrate.

At step 217, the controller again compares input and copy substrate sizes and determines whether an AutoFit magnification and margin adjustment should be implemented in order that margins be maintained in a visually pleasing manner. For instance, if the input document is A4 and the selected copy substrate is B4, the controller could direct the image processing algorithms to magnify the imaged area in order to maintain reasonably sized margins. If the input document dimensions were larger than the copy substrate dimensions, then a shrinkage of image area could be directed for the same reasons. These operations are carried out in step 218 using AutoFit algorithms that are conventional in the art.

In review, there is disclosed a sheet feeder with an automatic size sensor that includes sensors for detecting both dimensions of a sheet, including sensing at least one of the dimensions with sufficient accuracy to identify the sheet as being most probably one of a list of common input document sizes. Once the size of input documents and copy substrates are known, a series of image enhancing and productivity improvements are enabled by the methods of the present invention. These include, without limitation, improved automated selection of copy substrates, automated rotation of digital images to properly align the orientation of input and copy documents, centering algorithms, and AutoFit and margin adjustment features.

It is, therefore, evident that there has been provided in accordance with the present invention methods that fully satisfy the aims and advantages set forth above. While the invention has been described in conjunction with several methods, it is evident that many alternatives, modifications, and variations will be apparent to those skilled in the art. Accordingly, it is intended to embrace all such alternatives, modifications and variations as fall within the spirit and broad scope of the appended claims.

What is claimed is:

1. A method in an imaging system for selecting a copy substrate tray from a plurality of trays containing copy substrates with differing dimensions, comprising:
    a. identifying a first dimension and a second dimension of the copy substrate loaded into each tray;
    b. using at least one adjustable guide to determine a first dimension of an input document;
    c. identifying a second dimension of the input document;
    d. determining whether the dimensions of the input document are within a specified range of the dimensions of a copy substrate loaded into the trays;
    e. in response to determining that the dimensions of the input document are within the specified range, selecting the tray containing the copy substrate; and
    f. in response to determining that the dimensions of the input document are not within the specified range, making a preliminary selection of the tray containing a copy substrate with dimensions that most correspond to the dimensions of the input document.

2. The method of claim 1, wherein the steps of using the adjustable guide and of identifying the second dimension of the input document occur prior to initiation of movement of the input document from the input tray.

3. The method of claim 1, further comprising the step of allowing an operator to input instructions affecting selection of a copy substrate tray.

4. The method of claim 1, further comprising, after the step of making, in response to determining that the dimensions of the input documents are not within the specified range, a preliminary selection of the tray containing a copy substrate with dimensions that most correspond to the dimensions of the input document, making a final selection of a copy substrate tray based in part upon the size of at least one margin expected to be created on the copy substrate if the preliminary selection is made the final selection.

5. The method of claim 1, further comprising, after the step of making, in response to determining that the dimensions of the input documents are not within the specified range, a preliminary selection of the tray containing a copy substrate with dimensions that most correspond to the dimensions of the input document, making a final selection of a copy substrate tray based at least in part upon the amount of magnification adjustment necessary to render an approximate correspondence between the dimensions of the input document to the dimensions of the copy substrate loaded in the tray that has been preliminarily selected.

6. The method of claim 1, further comprising the step of commencing movement of a copy substrate out of the tray in which it is loaded not later than the time at which a trailing edge of the input document exits from an input tray.

7. The method of claim 1, further comprising the steps of:
    a. scanning information from the input document;
    b. comparing the orientation of the input document to the orientation of the copy substrate in the selected tray; and
    c. in response to determining, by use of the step of comparing, that the orientations differ, rotating the scanned information into the orientation of the copy substrate.

8. The method of claim 1, further comprising, the steps of:
    a. comparing the first dimension of the input document to the second dimension of the input document;
    b. determining, by use of the step of comparing, whether the input document is loaded into an input tray short side first; and
    c. in response to determining that the input document is loaded into the input tray short side first, notifying the operator that the input document is loaded short side first.

9. The method of claim 8, further comprising the step of pausing the imaging system in response to determining that the input document is loaded short side first.

10. The method of claim 1, further comprising the steps of:
    a. comparing the location of at least one center line of the input document to the location of a center line of the copy substrate loaded in the selected tray;
    b. determining whether the center line of the input document corresponds to the center line of the copy substrate;
    c. obtaining an image of information contained on the input document; and
    d. in response to determining that the center lines do not correspond, shifting the image such that the image center line corresponds to the center line of the copy substrate.

11. The method of claim 1, further comprising, in response to a comparison showing that the dimensions of the input document are not within the specified range, the step of adjusting at least one margin to be printed onto the copy substrate in order to compensate for the difference in dimensions between the input document and the copy substrate.

12. The method of claim 1, further comprising, in response to a comparison showing that the dimensions of the input document are not within the specified range, the step of changing the magnification of the image to be printed onto the copy substrate in order to compensate for the difference in dimensions between the input document and the copy substrate.

13. A method in an imaging system that prints information obtained from an input document onto a copy substrate, comprising:
    a. using at least one adjustable guide to determine a first dimension of the input document;
    b. identifying a second dimension of the input document;
    c. identifying a first dimension and a second dimension of the copy substrate;
    d. determining whether the dimensions of the input document are within a specified range of the dimensions of the dimensions of the copy substrate;
    e. in response to a determining that the dimensions of the input document are within the specified range, printing the information as obtained from the input document; and
    f. in response to determining that the dimensions of the input document are not within the specified ranges, making adjustments to the information prior to printing the information onto the copy substrate.

14. The method of claim 13, wherein the steps of using the adjustable guide and of identifying the second dimension of the input document occur prior to initiation of movement of the input document from the input tray.

15. The method of claim 13, further comprising the step of commencing of movement of a copy substrate for printing not later than the time at which a trailing edge of the input document exits from an input tray.

16. The method of claim 13, further comprising the steps of:
   a. scanning information from the input document;
   b. comparing the orientation of the input document to the orientation of the copy substrate in the selected tray; and
   c. in response to determining by use of the step of comparing, that the orientations differ, rotating the scanned information into the orientation of the copy substrate.

17. The method of claim 13, further comprising, the steps of:
   a. comparing the first dimension of the input document to the second dimension of the input document;
   b. determining, by use of the step of comparing, whether the input document is loaded into an input tray short side first; and
   c. in response to determining that the input document is loaded into the input tray short side first, notifying the operator that the input document is loaded short side first.

18. The method of claim 17, further comprising the step of pausing the imaging system in response to determining that the input document is loaded short side first.

19. The method of claim 13, further comprising the steps of:
   a. comparing the location of at least one center line of the input document to the location of a center line of the copy substrate;
   b. determining whether the center line of the input document corresponds to the center line of the copy substrate;
   c. in response to determining that the center lines do not correspond, shifting the printing of information obtained from the input document such that the information center line corresponds to the center line of the copy substrate.

20. The method of claim 13, further comprising, in response to a comparison showing that the dimensions of the input document are not within the specified range, the step of adjusting at least one margin to be printed onto the copy substrate in order to compensate for the difference in dimensions between the input document and the copy substrate.

21. The method of claim 13, further comprising, in response to the step of comparing showing that the dimensions of the input document are not within the specified range, the step of changing the magnification of the image to be printed onto the copy substrate in order to compensate for the difference in dimensions between the input document and the copy substrate.

* * * * *